June 10, 1930.  A. H. G. FOKKER  1,763,228
AIRPLANE AND THE LIKE
Filed Sept. 10, 1925
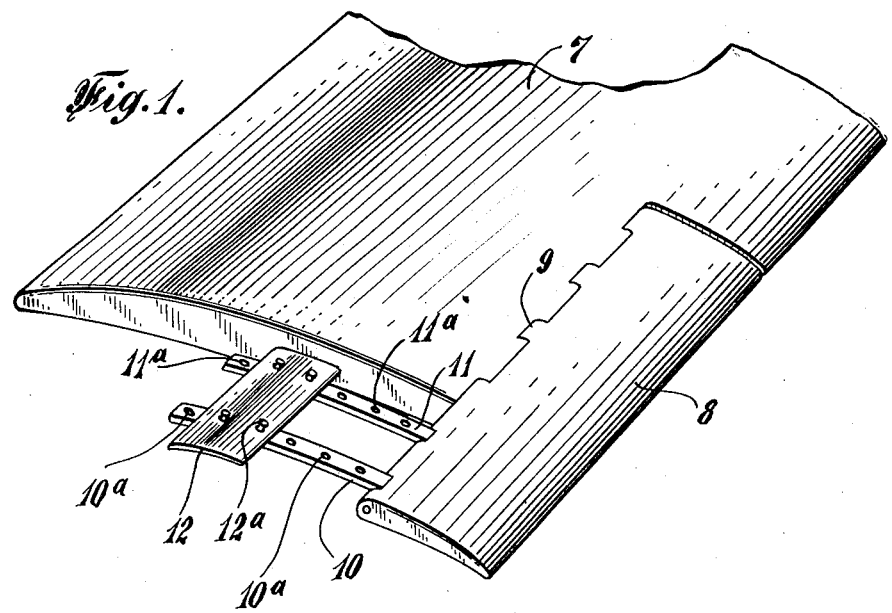
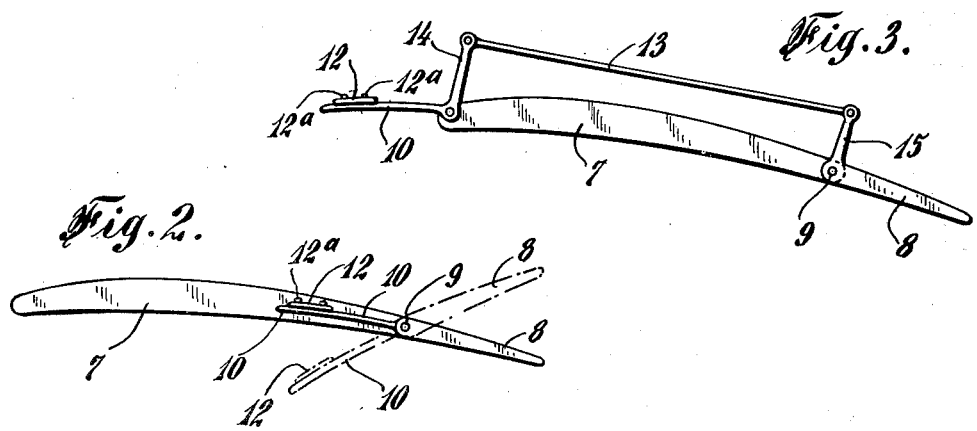
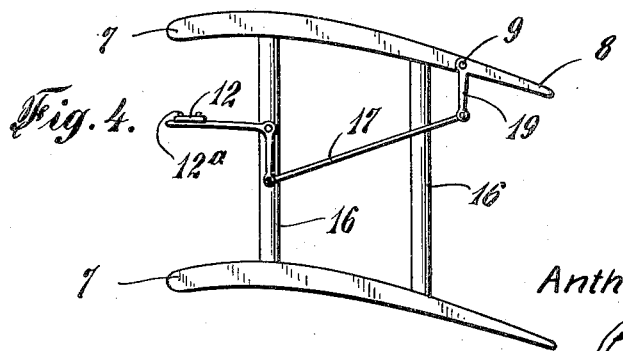
INVENTOR
Anthony H. G. Fokker
BY
ATTORNEY Patented June 10, 1930

1,763,228

UNITED STATES PATENT OFFICE

ANTHONY H. G. FOKKER, OF AMSTERDAM, NETHERLANDS, ASSIGNOR TO FOKKER AIRCRAFT CORPORATION OF AMERICA, A CORPORATION OF DELAWARE

AIRPLANE AND THE LIKE

Application filed September 10, 1925. Serial No. 55,445.

As is well known, the so-called control surfaces of an airplane, that is the ailerons, elevator and rudder, whereby the movement of the airplane about its longitudinal, transverse and vertical axes is controlled, are manually operated, the ailerons and elevator through the medium of a lever, known as a joy-stick, and the rudder by means of a footbar, both of these instrumentalities being located in the cock-pit, convenient to the pilot or operator of the airplane.

The manual operation of these control surfaces requires considerable effort on the part of the aviator or pilot, owing to the resistance set up by the forces acting upon the surface area thereof, it being obvious that the greater the area of the control surface, the greater will be the effort required to operate it. In fact, it has been found that beyond certain dimensions, the effort which must be expended to actuate the control surfaces in the customary manner renders proper manipulation of the control mediums more or less difficult.

Therefore, with the growing tendency to greater wing spreads in airplane construction, and the proportionate increase in the size of the control surfaces, the operation of the latter solely by manual means as at present, is becoming a limiting factor in the development of airplanes having the supporting surfaces essential to many of the requirements of commercial use.

The general object of the present invention is to overcome the disadvantages residing in the current methods of actuating the control surfaces in a simple and economical manner, whereby the effort required on the part of the aviator or pilot will be reduced to a minimum, while at the same time the flight of the airplane may be more positively controlled.

More specifically, it is the object of my invention to provide a method and means of actuating the ailerons or flaps or other directional control surfaces of airplanes whereby the forces developed in flight will be utilized to perform the work under manual guidance of the pilot or aviator, so that the operation will be semi-automatic.

My invention is also directed to a method and means of controlling the movement or actuation of the movable surfaces of an airplane or the like, for changing the direction or inclination of flight and for effecting lateral stability, which may be practiced by a simple arrangement of mechanism susceptible of being readily installed or incorporated in existing types of airplane structures, without alteration thereof, at a minimum of cost.

My invention also contemplates means, as aforesaid, for simplifying the operation of the control surfaces, whereby a wide range of adjustability is attainable so that the work capacity of the actuating elements may be diminished or increased as may be desired or found necessary in the practical use of my invention.

Other objects and advantages of my invention will present themselves as the description proceeds, and I would have it understood that I reserve unto myself all rights to the full range of equivalents, both in structure and in use, to which I may be entitled under my invention in its broadest aspect.

For the purposes of the present disclosure, I have elected to illustrate and describe certain embodiments of my invention as employed in connection with the operation of the ailerons or stabilizing devices. However, to those skilled in the art, it will be manifest that my method of semi-automatic actuation of the control surfaces may be practiced with equally satisfactory results in the functioning of the rudder and the elevator or tail flap, my invention as defined in the appended claims being broadly directed to the actuation of any so-called control surface or surfaces of air or sea craft, to which it may be applied.

In the drawings:

Figure 1 is a view in perspective of a section of an airplane wing, showing the cooperating aileron or flap and the auxiliary surface, whereby its movement is accomplished.

Figure 2 is a side elevation of the structure shown in Figure 1, the positions of the aileron and auxiliary surface, when the former is raised being shown in dotted lines.

Figure 3 is a side elevation of a modified embodiment of my invention, wherein the auxiliary surface is disposed at the leading edge of the wing, and Figure 4 is a further modification of my invention, in which the auxiliary surface is supported between the wings of a biplane, as from the struts.

Referring now to the drawings in detail, in which like characters of reference are employed to designate similar parts in the several views, and particularly to the structure shown in Figures 1 and 2, 7 indicates the wing or lifting surface of an airplane of the conventional type which is provided with the usual aileron or flap 8, for controlling the movement of the airplane about its longitudinal axis, the said aileron or flap being hinged to the wing at 9 in accordance with established practice.

As will be observed, the span of the aileron or flap 8 is greater than the cut-out of the wing within which it is located, so that it projects beyond the end thereof, as clearly shown in Figure 1. Fixed to the leading edge of the protruding portion of the aileron and extending forwardly therefrom, are a pair of preferably parallel arms 10 and 11 which may be apertured as shown at 10ª and 11ª.

The aforesaid arms 10 and 11 serve as supports or carriers for the auxiliary surface 12 which is preferably detachably fastened thereto by means of bolts or pegs 12ª, extending through or into the apertures 10ª and 11ª. The auxiliary control surface 12 may be rectangular, as shown, or of any other suitable outline, the dimensions and camber being dictated by practical flight conditions in attaining the objects of the invention.

The arms 10 and 11 are streamlined and may be of any suitable length and straight or curved longitudinally as may be found necessary, the forward extremities thereof being preferably to the rear of the median line of the wing so that the auxiliary surface 12 will be disposed behind the centre of pressure when in any of the several positions in which it may be located by means of the detachable fastening means and cooperating apertures in the said arms.

In normal flight, the auxiliary surface 12, as shown in Figures 1 and 2, is preferably disposed at a zero angle of incidence, it being obvious that as the aileron is operated to rotate upon its axis in the customary manner, the auxiliary surface 12 will move with it. The resulting change in the angularity of the latter and the air impinging thereagainst will create a leverage force, of which the aileron hinge is the fulcrum, which will tend to rotate the aileron on its axis to the desired functioning angle under the positive and constant guidance or control of the aviator, the effort required of the latter in initiating the movement of the aileron and controlling it to completion being relatively negligible.

Manifestly, the leverage force obtained may be predetermined within certain limits by moving the auxiliary surface along the supporting arms, toward or away from the leading edge of the aileron. Likewise, the angle of incidence of the auxiliary surface in normal flight may be positive or negative as may be determined in advance, for carrying out the purposes of the invention as heretofore set forth.

In the structure shown in Figure 3, the auxiliary surface 12 is hinged at 20 to the leading edge of the wing 7 and connected to the aileron 8 through the medium of the rod 13 pivoted to the levers 14 and 15, while in Figure 4, the auxiliary surface 12 is shown hinged between the wings of a biplane, as in the struts 16 and similarly connected to the aileron 8 by means of the rod 17 and cooperating levers 18 and 19.

It will of course be understood that an auxiliary surface is carried by, or connected to, each aileron and that the latter are moved simultaneously in opposite directions in maintaining lateral stability of the airplane as at present.

While I have specifically described my invention as used in conjunction with ailerons, it will be understood, as previously pointed out, that auxiliary surfaces, such as 12, may be applied to the rudder and elevator or other movable control surfaces for utilizing the aero-dynamic forces to operate the same under manual control or direction. For example, an auxiliary surface may be supported from, and above or below, the elevator or on the tail of the fuselage and connected to the elevator by suitable linkage so as to function in the same manner as when applied to the aileron. Likewise, an auxiliary surface may be carried by the rudder, preferably disposed in a vertical plane, or supported upon or from a contiguous part of the fuselage and connected to the rudder so as to accomplish the desired result.

Further, it will be evident that in lieu of disposing the auxiliary surface as shown in the several figures of the drawings, it may be located in the wing, or above or below the same and connected to the control surface in any manner suitable to the practicing of my invention, which is broadly directed to a method and means for actuating the control surfaces of airplanes or the like, by utilizing the forces created by flight to move the control surfaces under the manual control or guidance of the operator of the airplane.

What I claim is:

1. Means for operating the control surface of an airplane, comprising an auxiliary surface connected to said control surface and adapted to be moved by the forces developed in flight and means for rendering said auxiliary surface effective by the manual operation of the control surface, said auxiliary surface being movable fore and aft relatively to the control surface, whereby the amount of effort produced by said auxiliary surface may be increased or diminished.

2. In combination with the main plane of an airplane, a control surface pivoted near the trailing edge of the main plane, an auxiliary surface operatively connected to the control surface in advance of the control surface, by arms which are connected directly to the control surface and which pivot about the same axis as the control surface for utilizing the reaction of the air for moving the control surface, both the control and auxiliary surfaces being positioned to the rear of the center of pressure of the main plane, and means for changing the setting of the auxiliary surface with respect to the control surface so that for a given position of the control surface the effective turning force exerted thereon by the auxiliary surface can be varied.

3. In combination with the main plane of an airplane, a control surface pivoted near the trailing edge of the main plane, an auxiliary surface connected to the control surface and extending forwardly therefrom, for utilizing the reaction of the air for moving the control surface, both the control and auxiliary surfaces being mounted to the rear of the center of pressure of the main plane, and means permitting the setting of the auxiliary surface at different positions fore and aft with respect to the control surface.

4. In combination with the main plane of an airplane, an aileron hinged near the trailing edge of the main plane and projecting beyond the end thereof, an auxiliary surface connected to the aileron and positioned in front of that portion of the aileron that projects beyond the end of the main plane, the auxiliary surface being settable at different positions with respect to the aileron when the aileron is in a given position, for varying the effect of the auxiliary surface on the aileron.

ANTHONY H. G. FOKKER.